(12) United States Patent
Hong et al.

(10) Patent No.: US 10,793,651 B2
(45) Date of Patent: Oct. 6, 2020

(54) POLYETHYLENE RESIN HAVING EXCELLENT IMPACT STRENGTH

(71) Applicant: LG Chem, Ltd., Seoul (KR)

(72) Inventors: Bog Ki Hong, Daejeon (KR); Kyung Jin Cho, Daejeon (KR); Chang Woan Han, Daejeon (KR); Soon Ho Sun, Daejeon (KR); Sun Mi Kim, Daejeon (KR); Yi Young Choi, Daejeon (KR); Ki Soo Lee, Daejeon (KR)

(73) Assignee: LG Chem, Ltd. (KR)

( * ) Notice: Subject to any disclaimer, the term of this patent is extended or adjusted under 35 U.S.C. 154(b) by 45 days.

(21) Appl. No.: 16/088,177

(22) PCT Filed: Nov. 6, 2017

(86) PCT No.: PCT/KR2017/012490
§ 371 (c)(1),
(2) Date: Sep. 25, 2018

(87) PCT Pub. No.: WO2018/093085
PCT Pub. Date: May 24, 2018

(65) Prior Publication Data
US 2020/0010584 A1    Jan. 9, 2020

(30) Foreign Application Priority Data
Nov. 15, 2016   (KR) .................. 10-2016-0152222

(51) Int. Cl.
*C08F 10/02*     (2006.01)
*C08F 4/6592*    (2006.01)

(52) U.S. Cl.
CPC .................. *C08F 10/02* (2013.01)

(58) Field of Classification Search
USPC ......................................... 526/114
See application file for complete search history.

(56) References Cited

U.S. PATENT DOCUMENTS

| 2007/0197716 A1 | 8/2007 | Krishnaswamy et al. |
| 2014/0342141 A1 | 11/2014 | Cui et al. |
| 2015/0232589 A1 | 8/2015 | Best et al. |
| 2016/0115264 A1 | 4/2016 | Rohatgi et al. |
| 2018/0217039 A1 | 8/2018 | Hong et al. |

(Continued)

FOREIGN PATENT DOCUMENTS

| EP | 3162820 A1 | 5/2017 |
| JP | 2015142887 A | 8/2015 |
| KR | 20080114740 A | 12/2008 |

(Continued)

OTHER PUBLICATIONS

ASTM D-1238-10, "Standard Test Method for Melt Flow Rates of Thermoplastics by Extrusion Plastometer," 15 pages; Published Mar. 2010. (Year: 2010).*

(Continued)

*Primary Examiner* — Fred M Teskin
(74) *Attorney, Agent, or Firm* — Lerner, David, Littenberg, Krumholz & Mentlik, LLP (57) ABSTRACT

The present invention relates to polyethylene resin having excellent impact strength, and more specifically, to polyethylene resin exhibiting excellent impact strength and flexural strength, when prepared into a molded product.

9 Claims, 2 Drawing Sheets

(56) References Cited

U.S. PATENT DOCUMENTS

2018/0265605 A1  9/2018  Shin et al.

FOREIGN PATENT DOCUMENTS

| KR | 20130055167 A | 5/2013 | | |
|---|---|---|---|---|
| KR | 101397077 B1 | 5/2014 | | |
| KR | 20150057964 A | 5/2015 | | |
| KR | 20160016784 A | 2/2016 | | |
| KR | 20160054844 A | 5/2016 | | |
| KR | 20160072068 A | 6/2016 | | |
| KR | 20160123172 A | 10/2016 | | |
| WO | WO 2017/160024 A1 * | 9/2017 | ............... | G01N 3/14 |

OTHER PUBLICATIONS

A. Alexakis et al., "Mild Protection and Deprotection of Alcohols as Ter-Butyl Ethers in the Field of Pheromone Synthesis", Tetrahedron Letters, Feb. 26, 1988, vol. 29, No. 24, pp. 2951-2954.
International Search Report for Application No. PCT/KR2017/012490 dated Feb. 9, 2018.
Extended European Search Report including Written Opinion for Application No. EP17871411.9 dated Jun. 6, 2019.

* cited by examiner

(Penetration)    (Cracking)

POLYETHYLENE RESIN HAVING EXCELLENT IMPACT STRENGTH

CROSS-REFERENCE TO RELATED APPLICATIONS

The present application is a national phase entry under 35 U.S.C. § 371 of International Application No. PCT/KR2017/012490 filed Nov. 6, 2017, which claims priority from Korean Patent Application No. 10-2016-0152222 filed Nov. 15, 2016, all of which are incorporated herein by reference.

TECHNICAL FIELDS

The present invention relates to polyethylene resin having excellent impact strength, and more specifically, to polyethylene resin exhibiting excellent impact strength and flexural strength, when prepared into a molded product.

BACKGROUND OF ARTS

Thermoplastic resin is a kind of a polymer compound that can be molded using heat and/or pressure, and is polymer that is easy to process, is dissolved when heat is applied, and returns to a solid state if a temperature is sufficiently lowered. Currently, various kinds of ethylene resin molded products are being used because they are easy to process in various forms and a part of them can be recycled.

Particularly, since polyethylene resin has excellent physical and chemical properties, can be easily polymerized, and can be easily processed by various molding methods due to high spiral flow, it is being applied for various uses.

The kinds of well known polyethylene may include high density polyethylene(HDPE), linear low density polyethylene(LLDPE), and low density polyethylene(LDPE) prepared using a high pressure reactor, etc., and in order to achieve various properties, they can be prepared through different processes. In order to prepare polyethylene having different properties, different kinds of monomers may be used, or different polymerization process conditions, for example, solution phase, slurry phase, or gas phase reactions, etc. may be used, or different catalysts, for example, Ziegler-Natta or metallocene, etc. may be used.

In plastic molded products, both rigidity and impact strength are important properties, but the rigidity and impact strength are known to be in a complementary relationship, and in general, material with high rigidity exhibits a brittle behavior, and thus, tends to have poor impact strength.

Thus, although many studies on polyethylene simultaneously having excellent rigidity and excellent impact strength are being progressed, there is a continued demand for polyethylene that can realize high rigidity and excellent impact strength, and simultaneously, has excellent processability, and thus, can be easily applied for packaging materials or housewares materials by injection, blow and compression molding, etc.

DETAILED DESCRIPTIONS OF THE INVENTION

Technical Problem

It is an object of the present invention relates to provide polyethylene resin having excellent impact strength, and more specifically, polyethylene resin having excellent impact strength and flexural strength, when prepared into a molded product.

Technical Solutions

The present invention provides polyethylene resin comprising ethylene polymer or (co)polymer of ethylene and alpha olefin, and having a spreading gradient value described below of 5 to 10 ($\times 10^6$ Pa/m).

According to one embodiment, the complex modulus value of the polyethylene resin specimen may be 10 to 17 ($\times 10^8$ Pa).

And, it may be preferable that the polyethylene resin satisfies the following Mathematical Formula 1:

$$(X-a)^2 + (Y-b)^2 \leq 25 \quad \text{[Mathematical Formula 1]}$$

in the Mathematical Formula 1,
X means a spreading gradient value($\times 10^6$ Pa/m),
Y means a complex modulus value($\times 10^8$ Pa),
a is 5 to 10, and b is 14 to 16.

And, a melt flow index (MI) measured by ASTM D 1238 may be 5 to 10 g/10 minutes, and a melt flow rate ratio under load ($MI_5/MI_{2.16}$, MFRR) measured by ASTM D 1238 may be 3 to 4.

The density value of the polyethylene resin measured by ASTM D 792 may be about 0.950 to about 0.970 g/cm$^3$.

And, a flexural strength value measured by ASTM D 790 may be 11,000 kgf/cm$^2$ or more, and a spiral flow value measured by ASTM D 3123 may be preferably 16 cm or more.

Such polyethylene resin may be prepared by the polymerization of ethylene and alpha olefin in the presence of a supported metallocene catalyst.

The present invention also provides a polyethylene resin molded product comprising the above described polyethylene resin.

Advantageous Effect

The polyethylene resin of the present invention has excellent impact strength and flexural strength, and simultaneously, has excellent processability, and thus, can be molded by various methods such as injection, blow and compression molding, etc., and can be easily applied for packaging materials or housewares materials.

VARIOUS EMBODIMENTS FOR THE INVENTION

The polyethylene resin of the present invention comprises ethylene polymer or (co)polymer of ethylene and alpha olefin, and has a spreading gradient value of 5 to 10 ($\times 10^6$ Pa/m).

As used herein, terms "a first", "a second" and the like are used to explain various constructional elements, and they are used only to distinguish one constructional element from other constructional elements.

And, the terms used herein are only to explain specific embodiments, and are not intended to limit the present invention. A singular expression includes a plural expression thereof, unless it is expressly stated or obvious from the context that such is not intended. As used herein, the terms "comprise" or "have", etc. are intended to designate the existence of practiced characteristic, number, step, constructional element or combinations thereof, and they are not intended to preclude the possibility of existence or addition of one or more other characteristics, numbers, steps, constructional elements or combinations thereof.

Although various modifications can be made to the present invention and the present invention may have various forms, specific examples will be illustrated and explained in detail below. However, it should be understood that these are not intended to limit the present invention to specific disclosure, and that the present invention includes all the modifications, equivalents or replacements thereof without departing from the spirit and technical scope of the invention.

Throughout the specification, polyethylene resin means to include both ethylene homopolymer and copolymer of ethylene and alpha olefin, and it includes linear low density polyethylene resin, low density polyethylene resin, and high density polyethylene resin.

The polyethylene resin of the present invention comprises ethylene polymer or (co)polymer of ethylene and alpha olefin, and has a spreading gradient value of 5 to 10 ($\times 10^6$ Pa/m).

The spreading gradient value means the average gradient between the minimum point and the second maximum point in a stress-strain curve, measured by ASTM D 638.

Specifically, the minimum point is a point where strain begins again according to stress increase after passing a yield point in a stress-strain curve, measured by ASTM D 638 for a polyethylene resin specimen, and which appears as the minimum value of the stress in the curve.

And, the second maximum point means a point where ultimate tensile strength (UTS) is reached after passing a yield point, i.e., the first maximum point, and passing through the strain hardening zone where permanent strain occurs, in a stress-strain curve, measured by ASTM D638 for a polyethylene resin specimen, and which appears as the maximum value of the stress in the graph (UTS point).

Thus, the Spreading Gradient Value means the mean change rate of stress to strain $$\frac{\Delta \text{stress}}{(\Delta \text{strain})},$$

in the strain hardening zone where permanent strain occurs, between the above defined minimum point and the second maximum point. Namely, it may be considered as the mean value of the gradients in the strain hardening zone, in a stress-strain curve, measured by ASTM D638.

Such a spreading gradient value may be measured by the steps of: measuring length change compared to the stress applied until a specimen is cut, by ASTM D638, for a polyethylene resin specimen, to schematize the stress value to the strain value; confirming the minimum point and the second maximum point of the schematized measured values; and calculating the spreading gradient value of the polyethylene resin specimen between the minimum point and the second maximum point.

Figure 1:
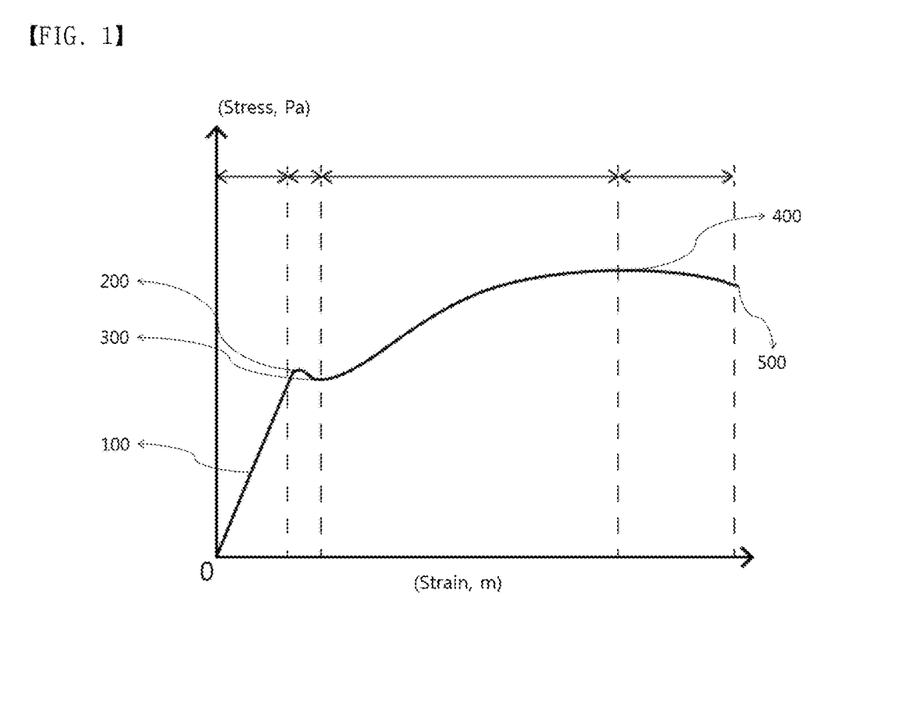
FIG. 1 is a graph showing the stress applied and change in strain, in a polyethylene resin specimen.

FIG. 1 is a graph showing the stress applied and change in strain, in a polyethylene resin specimen.

Referring to FIG. 1, the properties of a polyethylene resin molded product according to one aspect of the present invention may be measured by the steps of: measuring length change compared to the stress applied until a specimen is cut at the cut point (500), which is the point at which the specimen is broken and the measurement is completed, by ASTM D638, for a polyethylene resin specimen, to schematize the stress value to the strain value; confirming the minimum point (300) and the second maximum point (400) of the schematized measured values; and calculating the spreading gradient value of the polyethylene resin specimen between the minimum point and the second maximum point. Namely, the spreading gradient value may be represented by the mean change rate of stress to strain $$\frac{\Delta \text{stress}}{(\Delta \text{strain})},$$

in the strain hardening zone where permanent strain occurs, between the minimum point (300) and the second maximum point (400).

If the above defined spreading gradient value is within the above explained range, excellent tensile strength and impact strength may be exhibited in the prepared polyethylene resin molded product, and particularly, when a resin molded product of three-dimensional structure is prepared, excellent side impact strength may be realized.

According to one embodiment of the invention, complex modulus value of the polyethylene resin specimen may be preferably about 10 to about 17 ($\times 10^8$ Pa).

If the complex modulus value is within the above range, excellent tensile strength and impact strength may be exhibited in the prepared polyethylene resin molded product, and particularly, when a resin molded product of three-dimensional structure is prepared, excellent back impact strength may be realized. Namely, if both the spreading gradient value range and the complex modulus value range are satisfied, excellent side and back impact strengths may be exhibited in the prepared polyethylene resin molded product.

More specifically, for example, the polyethylene resin preferably satisfies the following Mathematical Formula 1.

$$(X-a)^2+(Y-b)^2 \leq 25 \qquad \text{[Mathematical Formula 1]}$$

in the Mathematical Formula 1,
X means a spreading gradient value($\times 10^6$ Pa/m),
Y means a complex modulus value($\times 10^8$ Pa),
a is 5 to 10, and b is 14 to 16.

Namely, polyethylene resin satisfying the above Mathematical Formula satisfies a spreading gradient value and a complex modulus value within certain ranges, thus realizing excellent side and back impact strengths, and besides, it has high spiral flow and flexural strength, and thus, can be easily applied for various products requiring excellent mechanical properties.

And, the polyethylene resin of the present invention may have a melt flow index (MI) measured by ASTM D 1238, of about 5 to about 10 g/10 minutes, preferably about 7 to about 8 g/10 minutes. According to another embodiment, it may be preferable that a melt flow rate ratio under load ($MI_5/MI_{2.16}$, MFRR) measured by ASTM D 1238, is about 3 to about 4, preferably about 3.1 to about 3.5. If a melt flow index and a melt flow rate ratio under load are within the above ranges, moldability and mechanical properties may be optimally balanced.

And, according to another embodiment of the invention, a density value measured by ASTM D 792 may be about 0.9 to about 1 g/cm$^3$, preferably about 0.950 to about 0.970 g/cm$^3$. If the density of the polyethylene resin according to the present invention is within the above range, when a molded product is prepared using the polyethylene resin, the surface properties may be appropriately maintained, and simultaneously, mechanical properties such as falling weight impact strength, side impact strength, back impact strength, tear strength, and tensile strength may be excellent.

And, the polyethylene resin of the present invention may have a flexural strength value measured by ASTM D 790, of about 11,000 kgf/cm$^2$ or more, preferably about 11,000 to about 13,000 kgf/cm$^2$, or about 11,500 to about 12,500 kgf/cm$^2$. As the polyethylene resin satisfies the above values, a polyethylene resin molded product using the same may have high rigidity, and simultaneously, have high impact strength to various impacts that can be applied from various directions.

And, the polyethylene resin may have a spiral flow value measured by ASTM D 3123, of about 16 cm or more, preferably about 16 to 22 cm, or about 19 to 21 cm.

The polyethylene resin according to the present invention may be ethylene homopolymer, or copolymer of ethylene and alpha olefin comonomers.

As the alpha olefin comonomers, alpha olefins having a carbon number of 4 or more may be used. The alpha olefin having a carbon number of 4 or more may include 1-butene, 1-pentene, 1-hexene, 1-methyl-1-pentene, 1-octene, 1-decene, 1-docene, 1-tetradecene, 1-hexadecene, 1-octadecene, or 1-eicosene, etc., but is not limited thereto. Among them, C4-10 alpha olefin, particularly, 1-butene or 1-hexene is preferable, and one kind or many kinds of alpha olefins may be used together as comonomers.

In the copolymerization of ethylene and alpha olefin-based comonomers, the content of the alpha olefin comonomers may be about 0.1 to about 15 wt %, preferably about 0.1 to about 10 wt %, so as to control the molecular weight and molecular weight distribution.

The above explained polyethylene resin may be prepared by ethylene polymerization, or copolymerization of ethylene and alpha olefin, in the presence of a supported metallocene catalyst.

Particularly, a supported metallocene catalyst wherein Group 4 transition metal is a central metal, one or more of a cyclopentadienyl group (Cp), an indenyl group, an indenoindenyl group, a benzothiophenyl group, or a benzocyclothiophenyl group donate unshared electron pairs, and a silane group is attached in the form of a tether, exhibits high polymerization activity, and thus, can prepare polyethylene polymer having the properties of the present invention.

And, even if a polymerization reaction is progressed with hydrogen, low hydrogen reactivity may be exhibited, and thus, ultra high molecular weight olefin polymer may be polymerized with still high activity. Thus, even if used together with catalysts having other properties, polyethylene polymer satisfying the properties of the present invention without deterioration of activity can be prepared.

Such a metallocene compound may be obtained by connecting an indenoindole derivative and/or a fluorene derivative with a bridge compound to prepare a ligand compound, and then, introducing a metal precursor compound to conduct metallation, and such a metallocene catalyst may be used alone or two or more kinds thereof may be hybrid supported in a carrier. The preparation methods of the metallocene compound and supported catalyst will be explained in Examples as described below.

As the cocatalyst that is supported together in a carrier so as to activate the metallocene compound, organic metal compounds including Group 13 metal may be used without specific limitations as long as it can be used when polymerizing olefin in the presence of a common metallocene catalyst.

Specifically, the cocatalyst compound may comprise at least one of an aluminum-containing first cocatalyst of the following Chemical Formula 1, and a borate-based second cocatalyst of the following Chemical Formula 2.

[Chemical Formula 1]

In the Chemical Formula 1, R28's are each independently, halogen, a C1-20 hydrocarbyl group unsubstituted or substituted by halogen, and k is an integer of 2 or more,

[Chemical Formula 2]

In the Chemical Formula 2, T$^+$ is polyatomic ion having a valence of +1, B is boron in +3 oxidation state, and G's are each independently selected from the group consisting of hydride, dialkylamido, halide, alkoxide, aryloxide, hydrocarbyl, halocarbyl and halo-substituted hydrocarbyl, and G has 20 or less carbon, provided that G is halide in one or less position.

Due to the use of the first and second cocatalysts, the molecular weight distribution of the finally prepared polyethylene may become more uniform, and polymerization activity may be improved.

The first cocatalyst of the Chemical Formula 1 may be an alkyaluminoxane compound including repeat units bonded in a linear, circular or network shape, and specific examples thereof may include methylaluminoxane (MAO), ethylaluminoxane, isobutylaluminoxane, or butylaluminoxane, and the like.

And, the second cocatalyst of the Chemical Formula 2 may be a borate-based compound in the form of trisubstituted ammonium salt, dialkyl ammonium salt, or trisubstituted phosphonium salt. Specific examples of the second cocatalyst may include borate-based compounds in the form of tri-substituted ammonium salts, such as trimethylammonium tetraphenylborate, methyldioctadecylammonium tetraphenylborate, triethylammonium tetraphenylborate, tripropylammonium tetraphenylborate, tri(n-butyl)ammonium tetraphenylborate, methyltetradecyclooctadecylammonium tetraphenylborate, N,N-dimethylanilinium tetraphenylborate, N,N-diethylanilinium tetraphenylborate, N,N-dimethyl(2,4,6-trimethylanilinium)tetraphenylborate, trimethylammonium tetrakis(pentafluorophenyl)borate, methylditetradecylammonium tetrakis(pentaphenyl)borate, methyldioctadecylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl(2,4,6-trimethylanilinium)tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4,6-tetrafluorophenyl)borate, dimethyl(t-butyl)ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate and N,N-dimethyl-(2,4,6-trimethylanilinium)tetrakis-(2,3,4,6-tetrafluorophenyl)borate; borate-based compounds in the form of dialkyl ammonium salts, such as dioctadecylammonium tetrakis(pentafluorophenyl)borate, ditetradecylammonium tetrakis(pentafluorophenyl)borate and dicyclohexylammonium tetrakis(pentafluorophenyl)borate; and borate-based compounds such as tri-substituted phosphonium salts, such as triphenylphosphonium tetrakis(pentafluorophenyl) borate, methyldioctadecylphosphonium tetrakis(pentafluorophenyl)borate and tri(2,6-dimethylphenyl)phosphonium tetrakis(pentafluorophenyl)borate.

In the supported metallocene catalyst, the mass ratio of total transition metal included in the metallocene compound to the carrier may be 1:10 to 1:1,000. When the carrier and the metallocene compound are included in the above mass ratio, the optimum shape may be exhibited.

And, the mass ratio of the cocatalyst compound to the carrier may be 1:1 to 1:100.

As the carrier, those containing hydroxyl groups on the surface may be used, and preferably, dried and surface moisture-removed carriers having highly reactive hydroxyl groups and siloxane groups may be used.

For example, silica, silica-alumina and silica-magnesia and the like dried at high temperature may be used, and they may commonly contain oxide, carbonate, sulfate, and nitrate such as $Na_2O$, $K_2CO_3$, $BaSO_4$, and $Mg(NO_3)_2$, and the like.

The drying temperature of the carrier may be preferably 200 to 800° C., more preferably 300 to 600° C., and most preferably 300 to 400° C. If the drying temperature of the carrier is less than 200° C., due to excessive moisture, surface moisture may react with the cocatalyst, and if it is greater than 800° C., pores on the carrier surface may be combined to reduce the surface area, and a lot of hydroxyl groups may be lost on the surface and only siloxane groups may remain, thus decreasing the reaction sites with the cocatalyst, which is not preferable.

The amount of the hydroxyl groups on the carrier surface may be preferably 0.1 to 10 mmol/g, more preferably 0.5 to 5 mmol/g. The amount of the hydroxyl groups on the carrier surface may be controlled by the preparation method and conditions of carrier, or drying conditions, for example, temperature, time, vacuum or spray drying and the like.

If the amount of the hydroxyl groups are less than 0.1 mmol/g, the reaction sites with the cocatalyst may be little, and if it is greater than 10 mmol/g, there is a possibility of being derived from moisture other than hydroxyl groups on the carrier particle surface, which is not preferable.

When progressing the polymerization of ethylene monomers using such a supported metallocene catalyst, the supported metallocene catalyst may be prepared as a prepolymerized catalyst by a contact reaction with olefin-based monomers before use, and for example, the catalyst may be separately contacted with olefin-based monomers such as ethylene, propylene, 1-butene, 1-hexene, 1-octene, etc. and prepared as a prepolymerized catalyst, before use.

For the polymerization reaction of olefin-based monomers, various polymerization processes known as a polymerization reaction of olefin monomers such as a continuous solution polymerization process, a bulk polymerization process, a suspension polymerization process, a slurry polymerization process or an emulsion polymerization process, etc. may be adopted. Such a polymerization reaction may be conducted at a temperature of about 50 to 110° C. or about 60 to 100° C., under pressure of about 1 to 100 bar or about 10 to 80 bar.

And, in the polymerization reaction, the hybrid supported metallocene catalyst may be used while being dissolved or diluted in a solvent such as pentane, hexane, heptane, nonane, decane, toluene, benzene, dichloromethane, chlorobenzene, etc. Here, the solvent may be treated with a small amount of alkylaluminum, etc. thus removing a small amount of water or air, etc. that may have an adverse influence on the catalyst in advance.

Hereinafter, the actions and the effects of the invention will be explained in more detail through specific examples of the invention. However, these examples are presented only as the illustrations of the invention, and the scope of right of the invention is not determined thereby.

EXAMPLE

Preparation of a Metallocene Compound

As the organic reagents and solvents required for the preparation of catalyst and polymerization, the products of Aldrich Company were used, and they were purified by a standard method, and as ethylene, high purity product of Applied Gas Technology, Inc. was passed through a moisture and oxygen filtration device, and then, polymerized. In all the steps of catalyst synthesis, support and polymerization, contact with air and moisture was blocked to increase reproducibility of the experiment.

Preparation Example 1 t-Butyl-O—$(CH_2)_6$—Cl was prepared using 6-chlorohexanol by a method described in the document (Tetrahedron Lett. 2951 (1988)), and NaCp was reacted therewith to obtain t-Butyl-O—$(CH_2)_6$—$C_5H_5$ (yield 60%, b.p. 80° C./0.1 mmHg).

And, at −78° C., t-Butyl-O—$(CH_2)_6$—$C_5H_5$ was dissolved in THF, and n-BuLi was slowly added thereto, followed by temperature rise to a room temperature, and reaction for 8 hours. The synthesized lithium salt solution was slowly added to a suspension of $ZrCl_4(THF)_2$ (1.70 g, 4.50 mmol)/THF (30 ml) at −78° C., and the solution was additionally reacted at room temperature for 6 hours.

All the volatile materials were vacuum dried, and a hexane solvent was added to the obtained oily liquid to filter. The filtered solution was vacuum dried, and then, hexane was added to induce precipitation at low temperature (−20° C.). The obtained precipitate was filtered at low temperature to obtain a compound [tBu-O—$(CH_2)_6$—$C_5H_4]_2ZrCl_2$ in the form of white solid. (yield 92%).

$^1$H NMR (300 MHz, $CDCl_3$): 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H).

Preparation Example 2

Preparation of a Ligand Compound 2 g of fluorene was dissolved in 5 mL MTBE and 100 mL hexane, 5.5 mL of a solution of n-BuLi (2.5M, in hexane) was added dropwise in a dry ice/acetone bath, and the solution was stirred at room temperature overnight. 3.6 g of (6-(tert-butoxy)hexyl)dichloro(methyl)silane was dissolved in 50 mL of hexane, and the fluorene-Li slurry was transferred thereto under a dry ice/acetone bath for 30 minutes, and the solution was stirred at room temperature overnight. Simultaneously, 5,8-dimethyl-5,10-dihydroindeno[1,2-b]indole (12 mmol, 2.8 g) was also dissolved in 60 mL of THF, 5.5 mL of a solution of n-BuLi (2.5M, in hexane) was added dropwise in a dry ice/acetone bath, and the solution was stirred at room temperature overnight. By NMR sampling of the reaction solution of fluorene and (6-(tert-butoxy)hexyl)dichloro(methyl)silane, the completion of the reaction was confirmed, and then, the dimethyl-5,10-dihydroindeno[1,2- b]indole-Li solution was transferred thereto under a dry ice/acetone bath. The solution was stirred at room temperature overnight. After the reaction, the solution was extracted with ether/water, and the remaining moisture in the organic layer was removed with $MgSO_4$, thus obtaining a ligand compound (Mw 597.90, 12 mmol), and it was confirmed in $^1$H-NMR that two isomers were produced.

$^1$H NMR (500 MHz, d6-benzene): −0.30~−0.18 (3H, d), 0.40 (2H, m), 0.65~1.45 (8H, m), 1.12 (9H, d), 2.36~2.40 (3H, d), 3.17 (2H, m), 3.41~3.43 (3H, d), 4.17~4.21 (1H, d), 4.34~4.38 (1H, d), 6.90~7.80 (15H, m)

Preparation of a Metallocene Compound 7.2 g (12 mmol) of the above prepared ligand compound was dissolved in 50 mL of diethylether, 11.5 mL of a solution of n-BuLi (2.5M, in hexane) was added dropwise in a dry ice/acetone bath, and the solution was stirred at room temperature overnight. The solution was vacuum dried to obtain sticky oil of brown color. It was dissolved in toluene to obtain slurry. $ZrCl_4(THF)_2$ was prepared, and 50 mL of toluene was added to prepare slurry. The 50 mL toluene slurry of $ZrCl_4(THF)_2$ was transferred in a dry ice/acetone bath. As the solution was stirred at room temperature overnight, it was turned into a violet color. The reaction solution was filtered to remove LiCl. Toluene in the filtrate was removed by vacuum drying, and then, hexane was added, and the solution was sonicated for 1 hour. The slurry was filtered to obtain 6 g of filtered solid, a dark violet metallocene compound (Mw 758.02, 7.92 mmol, yield 66 mol %). Two isomers were observed in $^1$H-NMR.

$^1$H NMR (500 MHz, $CDCl_3$): 1.19 (9H, d), 1.71 (3H, d), 1.50~1.70 (4H, m), 1.79 (2H, m), 1.98~2.19 (4H, m), 2.58 (3H, s), 3.38 (2H, m), 3.91 (3H, d), 6.66~7.88 (15H, m)

Preparation Example 3

As a metallocene compound precursor, Dichloro [rac-ethylenebis(4,5,6,7-tetrahydro-1-indenyl)]zirconium(IV) was prepared (Sigma Aldrich, Cas No: 100163-29-9).

Into an oven-dried 250 ml Schlenk flask, 2.3 g (5 mmol) of the metallocene compound precursor was introduced. Under argon, 1.02 g (10 mmol) of pivalic acid was added thereto, and the mixture was dissolved in 50 ml of dichloromethane. The reaction mixture was cooled to 0° C., and then, 1.4 ml (10 mmol) of triethylamine was slowly introduced. The bath was removed, and while slowly raising the temperature of the reaction mixture to room temperature, it was confirmed that the reaction mixture slowly turned from yellow into white within 30 minutes. After about 1 hour, the reaction solvent was completely removed under reduced pressure, 100 ml of ether was added, and then, the white solid was completely molten through sonification. The mixture in the flask was filtered under argon atmosphere to obtain a colorless filtrate, which was completely dried to obtain 2.65 g (yield: 90%) of white solid.

$^1$H NMR (500 MHz, $CDCl_3$): 1.19 (18H, s), 1.41~1.58 (4H, m), 1.72~1.79 (2H, m), 1.81~1.88 (2H, m), 2.21~2.25 (2H, m), 2.33~2.39 (2H, m), 2.52~2.60 (2H, m), 2.82~2.88 (2H, m), 3.03~3.16 (4H, m), 5.57 (2H, s), 5.92 (2H, s)

Preparation Example 4

Preparation of a Ligand Compound

Into two 250 ml Schlenk flasks, t-butylamine (13 ml, 120 mmol) and (6-tert-butoxyhexyl)dichloro(methyl)silane (16 g, 60 mmol) were introduced, and dissolved in 20 ml and 40 ml of ether, respectively.

The t-butylamine solution was cooled to −78° C., and then, the (6-tert-butoxyhexyl)dichloro(methyl)silane solution was slowly introduced, and the mixture was stirred at room temperature for 2 hours.

The produced white suspension was filtered to remove solid to obtain an intermediate in the form of an ivory solution, (1-(6-(tert-butoxy)hexyl)-N-(tert-butyl)-1-chloro-1-methylsilanamine).

$^1$H NMR (500 MHz, $CDCl_3$): 0.40 (3H, s), 1.16 (9H, s), 1.20 (9H, s), 1.29~1.52 (10H, m), 3.29 (2H, t).

Into a 250 ml Schlenk flask, 1,2-dimethyl-3H-benzo[b]cyclopenta[d]thiophene (1.7 g, 8.6 mmol) was introduced, and dissolved in THF (30 ml). The solution was cooled to −78° C., and then, a solution of n-BuLi (2.5M, 3.6 ml, 9.1 mmol) was added, and the mixture was stirred at room temperature overnight to obtain a reddish purple-brown solution. The solvent was replaced with toluene, and CuCN (39 mg, 0.43 mmol) dispersed in THF (2.0 ml) was introduced.

In a separately prepared 250 ml Schlenk flask, 1-(6-(tert-butoxy)hexyl)-N-(tert-butyl)-1-chloro-1-methylsilanamine was dissolved in toluene, and the solution was cooled to −78° C., and then, the previously lithiated solution was slowly introduced.

The solution was stirred at room temperature overnight to finish the reaction, and filtered to remove solid, thus obtaining a ligand in the form of a stick brown solution (4.2 g, yield: 99%)

After lithiation, the product was confirmed by $^1$H-NMR.

$^1$H NMR (500 MHz, pyridine-D5+$CDCl_3$): 1.68 (3H, s), 1.91 (9H, s), 2.15 (9H, s), 1.73~2.23 (10H, m), 3.15 (6H, s), 3.59 (2H, t), 7.08~7.82 (2H, m), 7.67 (1H, d), 7.81 (1H, d)

Preparation of a Metallocene Compound

Into a 250 ml Schlenk flask, 1-(6-(tert-butoxy)hexyl)-N-(tert-butyl)-1-(1,2-dimethyl-3H-benzo[b]cyclopenta[d]thiophen-3-yl)-1-methylsilanamine (4.2 g, 8.6 mmol) was put, and dissolved in toluene (14 ml) and n-hexane (1.7 ml).

The solution was cooled to −78° C., and then, a solution of n-BuLi (2.5M, 7.3 ml, 18 mmol) was added, and the solution was stirred at room temperature for 12 hours.

Trimethylamine (5.3 ml, 38 mmol) was introduced, and the solution was stirred at 40° C. for 3 hours.

In a separately prepared 250 ml Schlenk flask, $TiCl_4$ $(THF)_2$ (2.3 g, 8.6 mmol) was dispersed in toluene (10 ml), and then, the lithiated ligand solution was slowly introduced at −78° C., and the solution was stirred at room temperature for 12 hours.

The solvent was removed under reduced pressure, and the reaction mixture was dissolved in toluene and filtered to remove solid. The filtration solvent was removed to obtain a metallocene compound in the form of brown solid.

$^1$H NMR (500 MHz, $CDCl_3$): 0.79 (3H, d), 0.79~1.80 (10H, m), 1.18 (9H, s), 1.38 (9H, s), 2.33 (3H, d), 2.71 (3H, s), 3.33 (2H, t), 7.40~7.45 (2H, m), 7.73 (1H, d), 8.01 (1H, d).

Preparation Example 5

Preparation of a Ligand Compound 2.41 g (12 mmol) of 1,2-Dimethyl-3H-benzo[b]cyclopenta[d]thiophene (DMBCT) was dissolved in 100 ml of THF, and 5.5 ml (13.8 mmol) of a solution of n-BuLi (2.5M, in hexane) was added thereto dropwise under dry ice/acetone bath.

The solution was stirred at room temperature overnight to progress a reaction, thus obtaining a dark red solution.

In a glove box, 1.63 g of (6-(tert-butoxy)hexyl)dichloro(methyl)silane for the formation of a bridge group was prepared and the solution in 50 ml hexane was formed, and the DMBCT-Li solution was fed thereto dropwise under dry ice/acetone bath. The solution was stirred at room temperature overnight and the reaction was finished, and it was confirmed that yellow slurry was produced. The reaction was ended with water/ether, thus obtaining 3.83 g of yellow oil (yield: 96.6%)

$^1$H NMR (500 MHz, CDCl$_3$): −0.19-0.15 (3H, m), 1.18 (9H, d), 1.34~2.32 (22H, m), 3.16~3.247 (1H, m), 3.30~3.33 (2H, m), 3.75~3.76 (2H, m), 7.3~7.98 (8H, m)

Preparation of a Metallocene Compound 3.83 g of the ligand was dissolved in 100 ml of toluene, MTBE 3.1 ml (4.0eq.) was additionally introduced, and to the solution, 5.6 ml of a solution of n-BuLi (2.5M, in hexane) was added dropwise under dry ice/acetone bath.

After reacting at room temperature overnight, yellow slurry was obtained. In a glove box, 2.41 g (6.39 mmol) of ZrCl$_4$(THF)$_2$ was prepared and the solution in 50 ml toluene was formed, and to the solution, the lithiated ligand solution was added dropwise under dry ice/acetone bath. After reacting at room temperature overnight, it was confirmed that yellow slurry was produced.

LiCl was removed through filtration, and about 90% of toluene was dried under vacuum, followed by recrystallization with hexane.

The slurry was filtered to obtain 1.9 g of a metallocene compound as a yellow filtrate (yield: 39.2%)

$^1$H NMR (500 MHz, CDCl$_3$): 0.85~0.89 (3H, m), 1.11~1.19 (12H, m), 1.24~2.52 (22H, m), 3.30~3.40 (2H, m), 7.19~7.91 (8H, m)

Preparation of a Supported Catalyst

Silica (manufactured by Grace Davison Company, SYLOPOL 948) was dehydrated at 400° C. for 15 hours under vacuum.

[Preparation Example 1-1] Hybrid Support

Into a glass reactor of room temperature, 100 ml of toluene was put, and 10 g of the prepared silica was introduced, and then, the solution was stirred while raising the temperature of the reactor to 40° C. After sufficiently dispersing the silica, 60.6 ml of a solution of 10 wt % methylaluminoxane (MAO)/toluene was introduced, and the temperature was raised to 80° C., and then, the solution was stirred at 200 rpm for 16 hours. Thereafter, the temperature was lowered again to 40° C., and then, the solution was washed with a sufficient amount of toluene to remove non-reacted aluminum compound. After introducing 100 mL of toluene again, 0.5 mmol of the metallocene catalyst prepared in Preparation Example 1 was introduced, and the solution was stirred for 1 hour. After the reaction was finished, 0.5 mmol of the metallocene catalyst prepared in Preparation Example 2 was introduced, and the solution was stirred for 2 hours. And, after the reaction was finished, 0.5 mmol of the metallocene catalyst prepared in Preparation Example 1 was introduced, and the solution was stirred for 2 hours. After the reaction was finished, the stirring was stopped and the toluene layer was separated to remove, and then, remaining toluene was removed by pressure reduction at 40° C., thus preparing a supported catalyst.

[Preparation Examples 3-1 to 5-1] Single Support

A supported catalyst was prepared by the same method as Preparation Example 1-1, except that single support was progressed using 1.0 mmol of the metallocene catalyst prepared in Preparation Examples 3 to 5, respectively.

Polyethylene Polymerization

Example

In a dry box, 30 mg of each supported catalyst prepared above was weighed, and put in a 50 mL glass bottle, and then, the glass bottle was sealed with a rubber septum and taken out of the dry box, thus preparing a catalyst to be introduced. Polymerization was conducted in a 2 L metal alloy reactor that is equipped with a mechanical stirrer, can control the temperature, and is used under high pressure.

Into the reactor, 1.2 L of hexane containing 1.0 mmol of triethylaluminum was introduced, and each of the above prepared supported catalyst was introduced without air contact, and then, while continuously adding gas ethylene monomers at a pressure of 40 Kgf/cm$^2$, and hydrogen gas at about 0.7 vol % based on the ethylene monomers at 80° C., polymerization was conducted for 1 hour. In the case of copolymerization, comonomers were added at the same ratio as the hydrogen.

Stirring was stopped, and then, ethylene was vented to remove, thereby finishing the polymerization. After removing most of the polymerization solvent by filtration, the obtained polymer was dried in a vacuum oven of 80° C. for 4 hours.

Comparative Example

Polyethylene resin was prepared with commercially available metallocene or Ziegler Natta catalyst, as follows.

Comparative Example 1: Product name XP6070, Manufacturing Company: Daelim Industrial Comparative Example 2: Product name SM600Q, Manufacturing Company: LG.Chem.

Comparative Example 3: Product name SM800Q, Manufacturing Company: LG.Chem

Comparative Example 4: Product name 2210J, Manufacturing Company: Lotte Chemical Preparation of a Polyethylene Resin Specimen The above obtained polyethylene resin was dried in a vacuum oven of 40° C. overnight, and prepared in the form of a pellet using a twin screw extruder (BA-19, manufactured by BAUTECH).

The resin in the form of a pellet obtained by compression was dried again in a vacuum oven of 40° C. overnight, and then, prepared in the form of a dog bone specimen (ASTM D 638).

The basic properties of the prepared specimen are as follows.

1) density
Measured by ASTM D 792.
2) melt index (MI):
Measured at 190° C., according to ASTM D 1238.

The polymerization conditions and measured properties are summarized in the following Table 1.

TABLE 1

| | Catalyst used | MI | Density (g/cm3) | Weight average molecular weight (g/mol) | Molecular weight distribution | comonomer |
|---|---|---|---|---|---|---|
| Example 1 | Preparation Example 1-1 | 8.3 | 0.957 | 68,000 | 3.9 | 1-Butene |
| Example 2 | Preparation Example 3-1 | 9.1 | 0.957 | 62,000 | 3.6 | 1-Butene |
| Example 3 | Preparation Example 1-1 | 8.3 | 0.959 | 68,000 | 4.0 | 1-Butene |
| Example 4 | Preparation Example 4-1 | 7.5 | 0.959 | 74,000 | 4.3 | 1-Butene |
| Example 5 | Preparation Example 5-1 | 8.6 | 0.961 | 65,000 | 4.2 | — |
| Example 6 | Preparation Example 5-1 | 7.5 | 0.961 | 74,000 | 4.1 | — |
| Comparative Example 1 | — | 9.5 | 0.961 | 58,000 | 3.5 | — |
| Comparative Example 2 | — | 6.0 | 0.961 | 80,000 | 5.8 | — |
| Comparative Example 3 | — | 8.0 | 0.956 | 70,000 | 4.9 | 1-Butene |
| Comparative Example 4 | — | 7.7 | 0.955 | 72,000 | 3.8 | 1-Hexene |

Property Evaluation

Measurement of Spreading Gradient

The above prepared specimen was measured at a speed of 200 mm/min, using Z010 Universal Testing Machine (Zwick Company), and the spreading gradient value was calculated by the above explained method and the mean value of total 5 tests was indicated as the result.

Measurement of Complex Modulus:

Measured using Dynamic Mechanical Analysis.

Measurement of Spiral Flow

Measured by ASTM D 3123.

Evaluation of Impact Resistance 1:

A cylindrical basket with the average thickness of 2 mm and volume of 20 L was manufactured and filled with water, the cover was closed, and then, it was vertically dropped from the height of 2 m to evaluate impact resistance. The same experiment was repeated 10 times, and if the evaluated sample was not cracked at all, it was evaluated as good, if broken one or two times among the 10 times, evaluated as fair, and if broken three times or more, evaluated as poor.

Evaluation of Impact Resistance 2:

Under the same conditions as the evaluation of impact resistance 1, the cylindrical basket was vertically dropped while being laid on the side to evaluate impact resistance. The same experiment was repeated 10 times, and if the evaluated sample was not cracked at all, it was evaluated as good, if broken one or two times among the 10 times, evaluated as fair, and if broken three times or more, evaluated as poor.

Evaluation of Impact Resistance 3:

A circular plate specimen with the thickness of 2 mm was manufactured and fixed on a mount with an open base, and then, a 21.2 kg dart made of SUS was vertically dropped from the height of 1 m, the experiment was repeated 10 times and impact resistance was evaluated as the number of penetration or cracking of the specimen.

Figure 3:
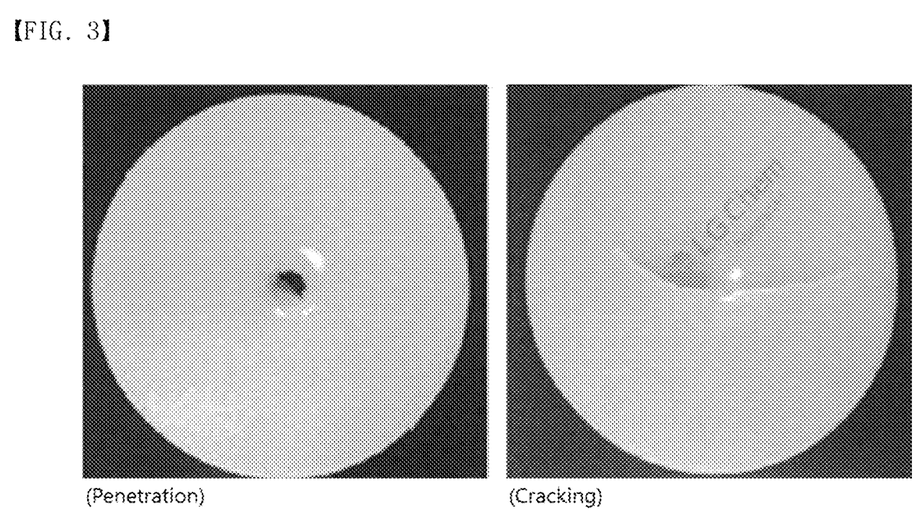
FIG. 3 shows the images showing the impact strength test results of a polyethylene resin molded product.

FIG. 3 show the images showing the impact resistance test results of the polyethylene resin molded product. Referring to FIG. 3, the penetration and cracking of the specimen in the form of a circular plate can be confirmed.

Flexural Strength:

Measured by ASTM D 790.

The measurement results are summarized in the following Table 2.

TABLE 2

| | Spreading gradient ($10^6$ Pa/m) | Complex modulus ($10^8$ Pa) | Impact resistance 1 | Impact resistance 2 | Impact resistance 3 | Spiral Flow (cm) | Flexural Strength (kgf/cm$^2$) |
|---|---|---|---|---|---|---|---|
| Example 1 | 7.6 | 14.8 | Good | Good | 0 | — | — |
| Example 2 | 4.8 | 13.3 | Good | Good | 0 | — | — |
| Example 3 | 8.8 | 16 | Good | Good | 0 | — | — |
| Example 4 | 7 | 15.6 | Good | Good | 0 | — | — |
| Example 5 | 5.9 | 16.2 | Good | Good | 0 | 19.5 | 12000 |
| Example 6 | 6.6 | 16.8 | Good | Good | 0 | 20.2 | 12100 |
| Comparative Example 1 | 4 | 18.6 | Fair | Good | 1 | 16 | 12000 |
| Comparative Example 2 | 17.1 | 18.8 | Poor | Poor | 5 | — | — |
| Comparative Example 3 | 15.8 | 17 | Fair | Poor | 3 | — | — |
| Comparative Example 4 | 10.7 | 15.3 | Good | Good | 0 | 18 | 10200 |

Referring to the Table 2, it can be confirmed that all the Examples exhibit excellent results in the impact resistance evaluation, and the spiral flow and flexural strength are also generally excellent.

Particularly, it can be confirmed that the spreading gradient values of the specimens of Examples 1 to 6 are measured to be about 4.8 to about 8.8, and Comparative Examples are out of this range, and it can be clearly confirmed that in the case of Comparative Examples, impact resistance test results are generally inferior to Examples.

Figure 2:
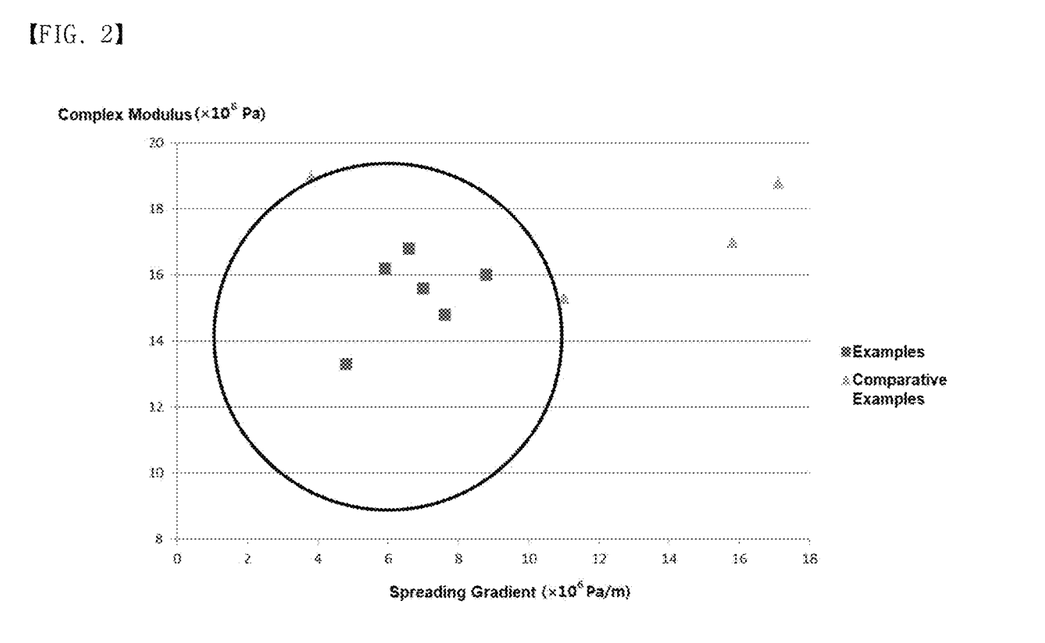
FIG. 2 is a distribution drawing showing complex modulus to spreading gradient, in a polyethylene resin specimen.

FIG. 2 is a distribution diagram showing the complex modulus to spreading gradient in the specimens of Examples and Comparative Examples.

Referring to FIG. 2, it can be seen that in the case of Examples, the values of complex moduli to spreading gradients are all included and distributed in the area corresponding to the radius 5, and that in the case of Comparative Examples, distributed outside of the corresponding area.

Particularly, it can be confirmed that Comparative Example 4 exhibits good results in the impact resistance evaluation, but spiral flow is lowered compared to Examples, and particularly flexural strength is lowered about 20% compared to Examples.

EXPLANATION OF SYMBOLS

100: Elastic zone
200: yield point
300: minimum point
400: second maximum point
500: cut point

The invention claimed is:

1. Polyethylene resin comprising ethylene polymer or (co)polymer of ethylene and alpha olefin, and having a spreading gradient value of 5 to 10 ($\times 10^6$ Pa/m), wherein the spreading gradient value means an average gradient between a minimum point and a second maximum point in a stress-strain curve, measured by ASTM D 638, wherein the minimum point is a point where strain begins again according to stress increase after passing a yield point in a stress-strain curve, measured by ASTM D 638, and wherein the second maximum point is a point where ultimate tensile strength (UTS) is reached in a stress-strain curve, measured by ASTM D 638.

2. The polyethylene resin according to claim 1, wherein the polyethylene resin has a complex modulus value is of 10 to 17 ($\times 10^8$ Pa).

3. The polyethylene resin according to claim 1, wherein the polyethylene resin satisfies the following Mathematical Formula 1:

$$(X-a)^2+(Y-b)^2 \leq 25 \qquad \text{[Mathematical Formula 1]}$$

in the Mathematical Formula 1,

X means a spreading gradient value($\times 10^6$ Pa/m),
Y means a complex modulus value($\times 10^8$ Pa),
a is 5 to 10, and b is 14 to 16.

4. The polyethylene resin according to claim 1, wherein the polyethylene resin has a melt flow index (MI) measured by ASTM D 1238 of 5 to 10 g/10 minutes.

5. The polyethylene resin according to claim 1, wherein the polyethylene resin has a melt flow rate ratio under load ($MI_5/MI_{2.16}$, MFRR) measured by ASTM D 1238 of 3 to 4.

6. The polyethylene resin according to claim 1, wherein the polyethylene resin has a density value measured by ASTM D 792 of 0.950 to 0.970 g/cm$^3$.

7. The polyethylene resin according to claim 1, wherein the polyethylene resin has a flexural strength value measured by ASTM D 790 of 11,000 kgf/cm$^2$ or more.

8. The polyethylene resin according to claim 1, wherein the polyethylene resin has a spiral flow value measured by ASTM D 3123 of 16 cm or more.

9. A polyethylene resin molded product comprising the polyethylene resin according to claim 1.

* * * * *